(12) United States Patent
Derson et al.

(10) Patent No.: US 7,162,320 B2
(45) Date of Patent: Jan. 9, 2007

(54) ASSEMBLY LINE QUALITY CONTROL

(75) Inventors: Carl Derson, Alliston (CA); Chad Knarr, Shelburne (CA)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 10/813,340

(22) Filed: Mar. 30, 2004

(65) Prior Publication Data

US 2004/0254675 A1    Dec. 16, 2004

Related U.S. Application Data

(60) Provisional application No. 60/459,088, filed on Mar. 31, 2003.

(51) Int. Cl.
| | |
|---|---|
| G06F 7/00 | (2006.01) |
| G06F 19/00 | (2006.01) |
| G06F 15/46 | (2006.01) |

(52) U.S. Cl. .................... 700/112; 700/108; 700/111; 198/340

(58) Field of Classification Search ............... 700/100, 700/101, 108, 111, 112; 198/340, 345.2
See application file for complete search history.

(56) References Cited

U.S. PATENT DOCUMENTS

| | | | |
|---|---|---|---|
| 3,821,991 A | | 7/1974 | Alexander |
| 4,307,325 A | | 12/1981 | Saar |
| 4,316,512 A | | 2/1982 | Kibblewhite et al. |
| 4,492,297 A | * | 1/1985 | Sticht ............... 198/345.3 |
| 4,571,696 A | | 2/1986 | Bitzer |
| 4,786,847 A | | 11/1988 | Daggett et al. |

(Continued)

FOREIGN PATENT DOCUMENTS

JP    02030446 A    *    1/1990

OTHER PUBLICATIONS

WO 00/55585, Method and Apparatus for Monitoring Rotating Machinery and Estimating Torque Therein, Publication Date: Sep. 21, 2000.

(Continued)

*Primary Examiner*—Michael D. Masinick
(74) *Attorney, Agent, or Firm*—Rankin, Hill, Porter & Clark LLP

(57) ABSTRACT

Disclosed herein is a method of controlling an assembly line, comprising the steps of providing an article assembly line; designating, on the assembly line, an upstream processing station and a downstream processing station; delivering a first article to the upstream processing station; monitoring an upstream processing function on the first article within the upstream processing station; and if, the upstream processing function in the upstream processing station on a first article is not complete; issuing a signal to an operator in the upstream processing station that the upstream processing function on the first article is not complete; extending the length of the upstream processing station to allow the upstream operator more time to complete the upstream processing function; monitoring the upstream processing function in the extended upstream processing station; and if the upstream processing function on the first article is still not complete; associating a label with the first article in the over travel processing station for downstream remedial attention; advancing the first article downstream from the extended upstream processing station; advancing a second article to the upstream processing station for the upstream processing function; and if the upstream processing function on the first article is complete; advancing the first article downstream from the extended upstream processing station; advancing a second article to the upstream processing station for the upstream processing function.

31 Claims, 11 Drawing Sheets

U.S. PATENT DOCUMENTS

| | | | |
|---|---|---|---|
| 4,894,767 A | | 1/1990 | Doniwa |
| 4,961,035 A | | 10/1990 | Inaba et al. |
| 5,088,045 A | * | 2/1992 | Shimanaka et al. ......... 700/110 |
| 5,289,885 A | | 3/1994 | Sakoh |
| 5,321,619 A | | 6/1994 | Matsuda et al. |
| 5,444,632 A | * | 8/1995 | Kline et al. ................. 700/100 |
| 5,457,866 A | | 10/1995 | Noda |
| 5,493,913 A | | 2/1996 | Layer et al. |
| 6,112,393 A | * | 9/2000 | Schlegel et al. ......... 29/407.01 |
| 6,161,629 A | | 12/2000 | Hohmann et al. |
| 6,311,786 B1 | | 11/2001 | Giardino et al. |
| 6,341,533 B1 | | 1/2002 | Schoeps |
| 6,381,526 B1 | | 4/2002 | Higashi et al. |
| 6,415,196 B1 | * | 7/2002 | Crampton et al. .......... 700/100 |
| 6,502,301 B1 | * | 1/2003 | Guner et al. .................. 29/771 |
| 6,516,239 B1 | * | 2/2003 | Madden et al. ............. 700/115 |
| 2002/0035876 A1 | | 3/2002 | Donaldson, Jr. |

OTHER PUBLICATIONS

WO 02/30624, Electronically Controlled Torque Management System for Threaded Fastening, Publication Date: Apr. 18, 2002.

\* cited by examiner

ASSEMBLY LINE QUALITY CONTROL

REFERENCE TO CO-PENDING APPLICATIONS

The entire subject matter of U.S. Provisional application Ser. No. 60/459,088 filed Mar. 31, 2003 and entitled ASSEMBLY LINE QUALITY CONTROL is incorporated by reference. The applicant claims priority benefit under Title 35, United States Code, and Section 119(e) of U.S. Provisional application Ser. No. 60/459,088 filed Mar. 31, 2003 and entitled ASSEMBLY LINE QUALITY CONTROL.

BACKGROUND OF THE INVENTION

1. Field of the Invention

The present invention relates to assembly lines and more particularly, but not necessarily exclusively, to automobile assembly lines.

2. Description of the Related Art

The manufacture or assembly of articles requires a number of processing stations along a manufacturing or assembly line. Each processing station has a number of functions which can, if not executed properly, degrade article quality.

For an article such as a vehicle, quality is extremely important. Commonly, vehicle assembly lines are now outfitted with sophisticated systems to monitor the functions at processing stations. One example of a system such as this is disclosed in U.S. Pat. No. 5,321,610 to Matsuda et al. (and assigned to HONDA), the entire subject matter of which is incorporated herein by reference, in which many different functions are controlled or scheduled along a vehicle assembly line.

It is an object of the present invention to provide a novel system and method for executing repairs on an assembly line.

SUMMARY OF THE INVENTION

In one of its aspects, the present invention provides a method of controlling an assembly line, comprising the steps of:
providing an article assembly line;
designating, on the assembly line, an upstream processing station and a downstream processing station;
delivering a first article to the upstream processing station;
monitoring an upstream processing function on the first article within the upstream processing station;
and if the upstream processing function in the upstream processing station on the first article is not complete:
  issuing a signal to an operator in the upstream processing station that the upstream processing function on the first article is not complete;
  extending the length of the upstream processing station to allow the upstream operator more time to complete the upstream processing function;
  monitoring the upstream processing function in the extended upstream processing station;
  and if the upstream processing function on the first article is not complete;
    associating a label with the first article for downstream remedial attention;
    advancing the first article downstream from the extended upstream processing station;
    advancing a second article to the upstream processing station;
and if the upstream processing function on the first article is complete;
  advancing the first article downstream from the upstream processing station or the extended upstream processing station;
  advancing a second article to the upstream processing station.

In an embodiment, one or more of the advancing steps may include the step of advancing the first article to the downstream processing station.

In an embodiment, the extended upstream processing station at least partially overlaps the downstream processing station. However, the upstream and downstream processing stations may be configured with a sufficient length so that, if any extension of the upstream processing station is necessary, it can be provided without the overlap. If desired, the upstream and downstream processing stations may be immediately adjacent one another and the extending step may thus have the effect of shortening the length of the downstream processing station as a result of extending the upstream processing station.

In an embodiment, the method further includes the step of issuing one or more signals to an operator in the upstream processing station and issuing one or more signals to an operator in the downstream processing station, the one or more signals indicating that the upstream processing function is not complete. The same signal may, if desired, be issued to both the upstream and downstream operators. For example, the signal may be visible and/or audible by both the upstream and downstream operators. Alternatively, the signal may be conveyed or encoded on a carrier signal conveyed over a wired or wireless data link, for example, with the operator.

In an embodiment, the extended upstream processing station is returned to its original size when the upstream processing function is complete or when the first article is advanced downstream. In one preferred example, this may also be timed with the issuing or associating of a label for the vehicle indicative of the upstream processing function being incomplete.

In an embodiment, the assembly line is a vehicle assembly line.

In an embodiment the upstream processing station is a torque theatre and wherein the monitoring step includes counting the number of correct torque functions executed in the torque theatre.

In an embodiment, the step of monitoring includes the steps of providing a torque tool and sensing the operation of the tool to determine when the tool is operating within a first set of predetermined conditions to register a correct torque function and to determine when the tool is operating within a second set of predetermined conditions to register an incorrect torque function.

In an embodiment, the step of monitoring includes the step of providing a map of torque targets to be hit during a predetermined torque sequence.

In an embodiment, the step of monitoring includes the step of recording the location of the torque tool relative to the map, and storing the location of the tool and a predetermined torque condition of the tool at each location.

In yet another aspect of the present invention there is provided an assembly line, comprising:
an upstream processing station and a downstream processing station;
supply means for delivering a first article to the upstream processing station;

at least one upstream processing device for processing the article in the upstream processing station;

monitoring means for monitoring the upstream processing device according to an upstream processing function;

the monitoring means being operable to determine if the processing function has been completed;

and if the monitoring means determines that the processing function has not been completed, the monitoring means being operable to issue a signal to an operator in the upstream processing station;

the monitoring means being operable to extend the length of the upstream processing station for the operator to complete the upstream processing function;

the monitoring means being operable to monitor the upstream processing function in the extended upstream processing station;

and if the monitoring means determines that the upstream processing function on the first article is not complete; the monitoring means being operable to cause a label to be associated with the first article for downstream remedial attention.

In still another of its aspects, the present invention provides an assembly line, comprising:

a first processing station and a second processing station;

conveyor means for conveying a plurality of articles along the assembly line and through at least one of the processing stations;

at least one first processing device for processing an article delivered to the first processing station;

first process monitoring means for monitoring the first processing device according to a first processing function;

at least one second processing device for processing an article delivered to the second processing station;

second process monitoring means for monitoring the second processing device according to a second processing function;

master monitoring means, communicating with each of the first and second process monitoring means for monitoring the assembly line;

each of the first and second process monitoring means being operable to determine if the corresponding first and second processing functions have been completed; and if the either process monitoring means determines that the corresponding first or second processing function has not been completed, the corresponding monitoring means is operable to issue a signal to an operator in the corresponding processing station that the corresponding processing function is not complete;

and where either processing function is not complete, the corresponding monitoring means being operable to extend the length of the corresponding processing station to form an extended processing station for the operator to complete the corresponding processing function;

the corresponding monitoring means being operable to monitor the processing function in the extended processing station; and if the corresponding monitoring means determines that the processing function on the article is still not complete; the monitoring means being operable to cause a label to be associated with the corresponding article for remedial attention.

In still another of its aspects, the present invention provides a method of controlling an assembly line, comprising:

a step for providing an article assembly line;

a step for designating, on the assembly line, an upstream processing station and a downstream processing station;

a step for delivering a first article to the upstream processing station;

a step for monitoring an upstream processing function on the first article while the first article is within the upstream processing station;

and if the upstream processing function in the upstream processing station on a first article is not complete:

a step for issuing a signal to an operator that the upstream processing function on the first article is not complete;

a step for extending the length of the upstream processing station to allow the upstream operator more time to complete the upstream processing function;

a step for monitoring the upstream processing function in the extended upstream processing station;

and if the upstream processing function on the first article is still not complete;

a step for associating a label with the first article;

a step for advancing the first article downstream from the extended upstream processing station;

a step for advancing a second article to the upstream processing station for the upstream processing function;

and if the upstream processing function on the first article is complete;

a step for advancing the first article downstream from the extended upstream processing station;

a step for advancing a second article to the upstream processing station for the upstream processing function.

In yet another of its aspects there is provided a method of monitoring the productivity of an operator in a processing station in an assembly line, comprising the steps of:

providing an article assembly line;

designating, on the assembly line, an upstream processing station and a downstream processing station;

delivering a first article to the upstream processing station;

monitoring an upstream processing function by an operator in the upstream processing station on the first article;

and if, following a predetermined condition, the operator has not completed the upstream processing function on the first article:

issuing a signal to an operator in the upstream processing station; and extending the length of the upstream processing station to allow the upstream operator more time to complete the upstream processing function;

monitoring the upstream processing function in the extended upstream processing station;

and if, after another predetermined condition, the operator still has not completed the upstream processing function on the first article;

identifying the first article for remedial attention;

advancing the first article downstream from the extended upstream processing station;

advancing a second article to the upstream processing station;

and if the upstream processing function on the first article is complete;

advancing the first article downstream from the upstream processing station or the extended upstream processing station;

advancing a second article to the upstream processing station; and recording an incomplete upstream processing function event or a complete upstream processing function event.

In yet another of its aspects, the present invention provides a method of controlling an assembly line, comprising the steps of:

providing an article assembly line;
designating, on the assembly line, a first processing station and a second processing station;
delivering a first article to the first processing station;
monitoring a first processing function on the first article within the first processing station;
and if the first processing function is not complete:
issuing a signal to an operator in the first processing station that the first processing function is not complete;
extending the length of the first processing station to allow the operator more time to complete the first processing function;
monitoring the first processing function in the extended first processing station;
and if the first processing function is not complete;
associating a label with the first article for remedial attention;
advancing the first article from the extended first processing station;
advancing a second article to the first processing station;
and if the first processing function is complete;
advancing the first article from the first processing station or the extended first processing station; and
advancing a second article to the first processing station.

In an embodiment, assembly line is operable to travel along a flow path in a predetermined direction. However, the assembly line may be operable to travel along a flow path in more than one predetermined direction, if desired.

Preferably, the second processing station is downstream from the first processing station, though there may be examples where the second processing station is located on an assembly line upstream from the first processing station, such as in an example where the direction of the assembly line is reversed during or after the processing step in the first processing station.

In yet another of its aspects, the present invention provides an assembly line, comprising:

a first processing station and a second processing station;
supply means for delivering a first article to the first processing station;
at least one first processing device for processing the article in the first processing station;
monitoring means for monitoring the first processing device according to a first processing function;
the monitoring means being operable to determine if the first processing function has been completed;
and if the monitoring means determines that the processing function has not been completed,
the monitoring means being operable to issue a signal to an operator in the first processing station;
the monitoring means being operable to extend the first processing station to allow the operator more time to complete the first processing function;
the monitoring means being operable to monitor the first processing function in the extended first processing station;
and if the monitoring means determines that the first processing function on the first article is still not complete, the monitoring means being operable to cause a label to be associated with the first article for remedial attention.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
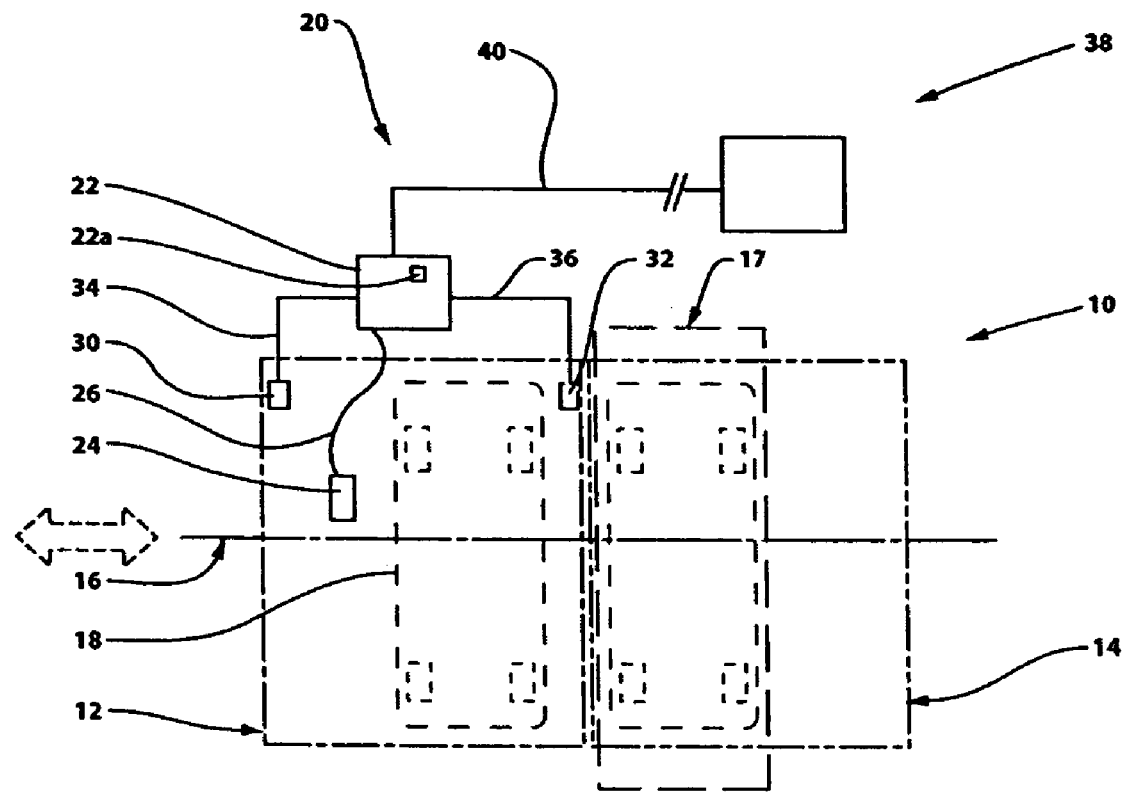
FIG. 1 is a schematic view of a portion of an assembly line.

Referring to FIG. 1, there is provided an assembly line shown generally at 10 having a first "upstream" processing station 12 and a second "downstream" processing station 14. It will be understood that one or more of the features of the first processing station 12 may also apply to the second processing station 14. The assembly line 10 is provided with a conveyor system, represented schematically by the chain-dotted path 16 to deliver a first article 18 to the first upstream processing station 12. In this particular example, the article 18 is a vehicle, though it could be one or more other articles, such as those involved in the manufacture of vehicles, or other articles which involve a number of processing steps along an assembly line and where a processing function or protocol as described herein below would be beneficial. In this case, the assembly line is operable to travel along a flow path in a predetermined direction, that is left to right as shown in FIG. 1. However, the assembly line travel may also, if desired, be operable to travel along a flow path in more than one predetermined direction, as represented by the dashed double arrow in FIG. 1.

The assembly line 10 is provided with a monitoring means in the form of a monitoring system, shown generally at 20, for monitoring an upstream processing device according to an upstream processing function, such as a torque function on a number of fasteners present in or for the vehicle 18 in the upstream processing station 12. The monitoring system 20 has a controller 22 which controls and/or monitors the torque function which is provided by a processing tool such as torque tool shown schematically at 24 and which communicates with the controller 22 by way of a communication link shown, for example, by the conductive path 26.

The monitoring system includes a vehicle entry limit switch 30 and a vehicle exit limit switch 32, each of which is operable to register the corresponding entry and exit of a vehicle to or from the upstream processing station 12. The entry and exit limit switches 30, 32 communicate with the controller 22 by way of conductive paths 34, 36 respectively.

The controller 22 communicates with a master controller 38 over communication channel 40.

Both the controller 22 and the master controller 38 are computer implemented and may be provided in a number of forms. Both may be embodied in a software program configured to run on one or more general purpose computers, such as a personal computer, or on a more substantial computer mainframe. The general purpose computer may work within a network involving several general purpose computers, for example those sold under the trade names APPLE or IBM, or clones thereof, which are programmed with operating systems known by the trade names WINDOWS, LINUX or other well known or lesser known equivalents of these. The system may involve pre-programmed software using a number of possible languages or a custom designed version of a programming software sold under the trade name ACCESS or similar programming software. The computer network may be a wired local area network, or a wide area network such as the Internet, or a combination of the two, with or without added security, authentication protocols, or under "peer-to-peer" or "client-server" or other networking architectures. The network may also be a wireless network or a combination of wired and wireless networks. The wireless network may operate under frequencies such as those dubbed 'radio frequency' or "RF" using protocols such as the 802.11, TCP/IP, BLUE TOOTH and the like, or other well known Internet, wireless, satellite or cell packet protocols. The system may, alternatively, be executed on a single custom built computer which is dedicated to the function of the system alone.

The controller 22 is operable to determine if the processing function has been completed by the processing tool 24, in this case a torque function by the torque tool 24. If the controller 22 determines that the processing function has not been completed, the monitoring system 20 is operable to issue a signal to an operator in the upstream processing station 12 that the upstream processing function on the first article is not complete. In this case, the monitoring system 20 is operable to lengthen the upstream processing station 12 to encompass the region identified at 17, thereby forming an extended upstream processing station 12,17.

In this example, the extended upstream processing station 12,17 at least partially overlaps the downstream processing station 14. However, the upstream and downstream processing stations 12, 14 may be a sufficient distance apart that the extended upstream processing station 12,17 may instead not overlap the downstream processing station 14. If desired, the upstream and downstream stations 12, 14 may be immediately adjacent one another, and the extending step may include the step of shortening the length of the downstream processing station.

The monitoring system 20 is operable to issue a signal, such as an alarm signal, to an operator in the upstream processing station 12 and, if need be, to an operator in the downstream processing station 14, that the upstream processing function is not complete. The same signal may, if desired, be issued to personnel or operators in both upstream and downstream stations 12, 14. For example, the signal may be visible and/or audible by both the upstream and downstream operators. The signal may be an audible signal such as a buzzer, a ringer, a tone generator, a voice synthesizer, or a visible signal such as a blinking light, a flag, or a signal having both an audible component and a visible component. In this case, the operator may be a human being or be a robotic device. The signal may also be emitted over a wired or wireless data link with the operator.

The monitoring system 20 is also operable to monitor the upstream processing function in the extended upstream processing station 12,17. If the monitoring system 20 determines that the upstream processing function on the first article is still not complete, the monitoring system 20 is operable to cause a label to be associated with the first article for downstream remedial attention. In this case, the label may be associated with the vehicle either while the vehicle is in the extended upstream processing station 12,17 or at some location downstream thereof.

In this case, the extended upstream processing station 12,17 is temporary, that is it is extended only when needed, namely when the upstream processing function is incomplete. In this case, the upstream processing station 12 is returned to its normal length or size when the upstream processing function is either complete or when the label is associated or issued, or a label file updated for the vehicle. The size of the extended upstream processing station 12,17 may depend on the speed of the assembly line 10 and the time necessary for the operator to finish the upstream processing function, as well as the assembly line "pitch", in other words the spacing between the articles thereon. For instance, on a vehicle assembly line, the normal pitch may be in the order of about 10'6" which corresponds approximately to 1.5 times the width of the vehicle, that is the spacing between the leading edges of adjacent vehicles on their vehicle carriers on the conveyor 16. The span of the upstream processing station 12 is, in this example, defined by the entry and exit limit switches 30, 32. If they are spaced a distance greater than the normal pitch, then more than one vehicle may appear in the upstream processing station 12 at one time, which may be undesirable in some cases.

Thus, the controller 22 is operable to determine if the upstream processing function has been completed when a predetermined condition exists. The predetermined condition may be an elapsed time, for example, following the tripping of the entry limit switch 30, indicating the presence of the vehicle in the upstream processing station. In this case, the allowed elapsed time may be calculated by the length of the upstream processing station 12 and the travel speed of the conveyor 16.

Alternatively, the predetermined condition may be detected by the triggering of an intermediate limit switch, located relative to the travel path between the entry and exit limit switches 30, 32. In this case, the intermediate limit switch may indicate the need to determine if the upstream processing station 12 needs to be extended, thus giving due notice to the operator in the downstream processing station 14.

In this particular example, the upstream processing station 12 is a torque theatre but could include other processes such as an installation step, a coating step, a removing step, an applying step or the like. The monitoring step in this example may include counting the number of correct torque functions executed in the torque theatre. The monitoring system 20 is operable, in this case, to monitor each torque function by the torque tool 24 by sensing the operation of the torque tool 24 to determine when it is operating within a first set of predetermined conditions to register a correct torque function and to determine when the torque tool 24 is operating within a second set of predetermined conditions to register an incorrect torque function. This can be achieved in a range of techniques, all being aimed at recording either each correct torque function, each incorrect torque function or both correct and incorrect torque functions. This might be achieved, for example, by the use of a torque tool of the type having a strain gauge transducer which proportionally flexes according to the torque being delivered by the tool, in which case the monitoring means may be operable to record either a relatively low signal or an exceedingly high signal as an "incorrect" or incomplete torque function, and a nominal or "OK" signal as a "correct" or complete torque function, again dependent on the first and second sets of predetermined conditions. An example of such a tool are those available under the trade name ATLAS COPCO.

In another case, the tool may use an angle encoder, and/or a current (or voltage, or power) flow meter which determines proportional torque value according to the magnitude of current (or voltage, or power). In still another case, an RF preset wrench, may be used of the type having a limit switch on the back of the wrench which, when the correct torque is achieved, closes to send a signal by way of a radio frequency carrier wave to the controller. In still another case, the tool may be a pneumatic tool having a pressure transducer operable to emit a signal when a predetermined pressure condition occurs on the inlet side of the tool or a pressure differential over the tool.

Figure 2:
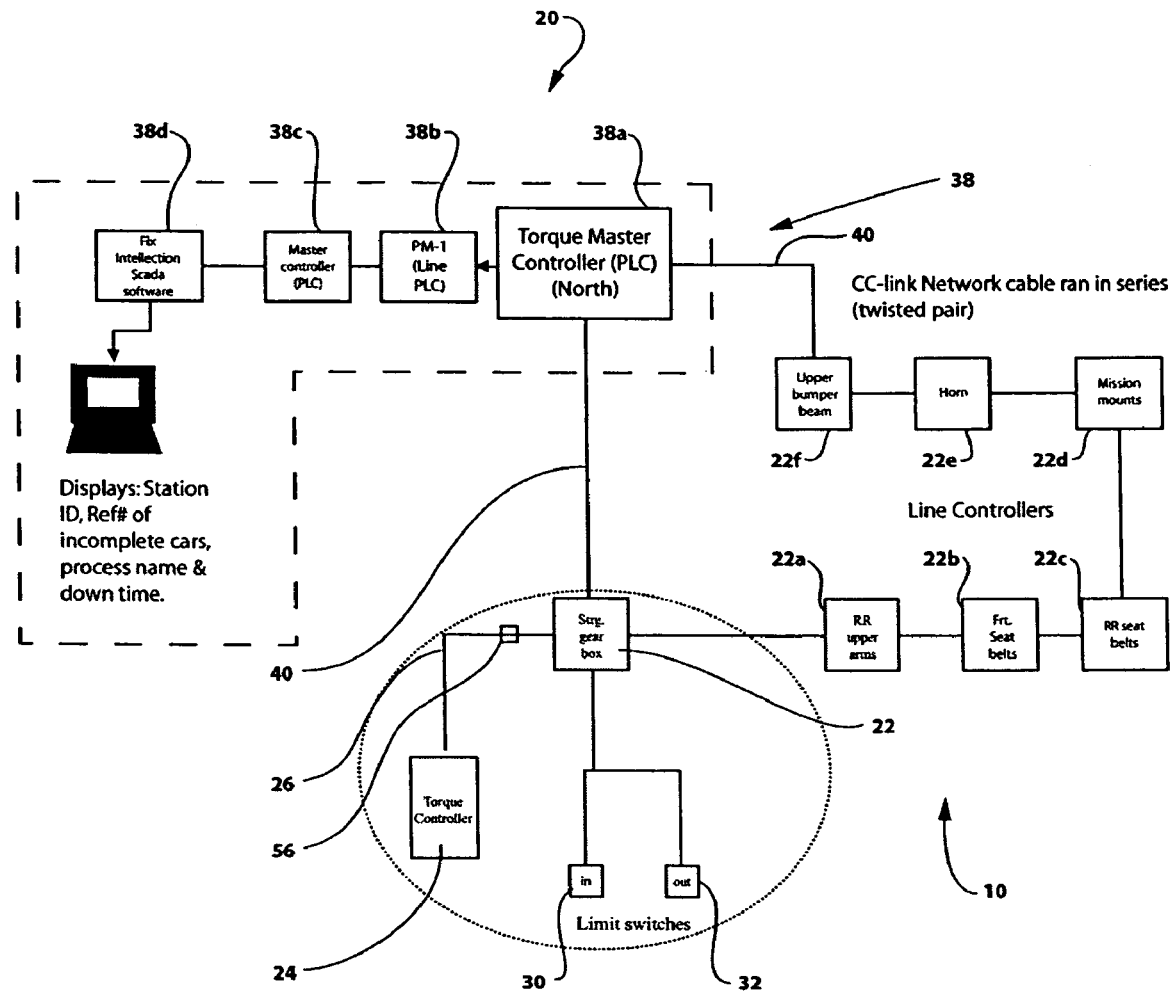
FIG. 2 is a schematic view of another portion of the assembly line of FIG. 1.
Figure 3:
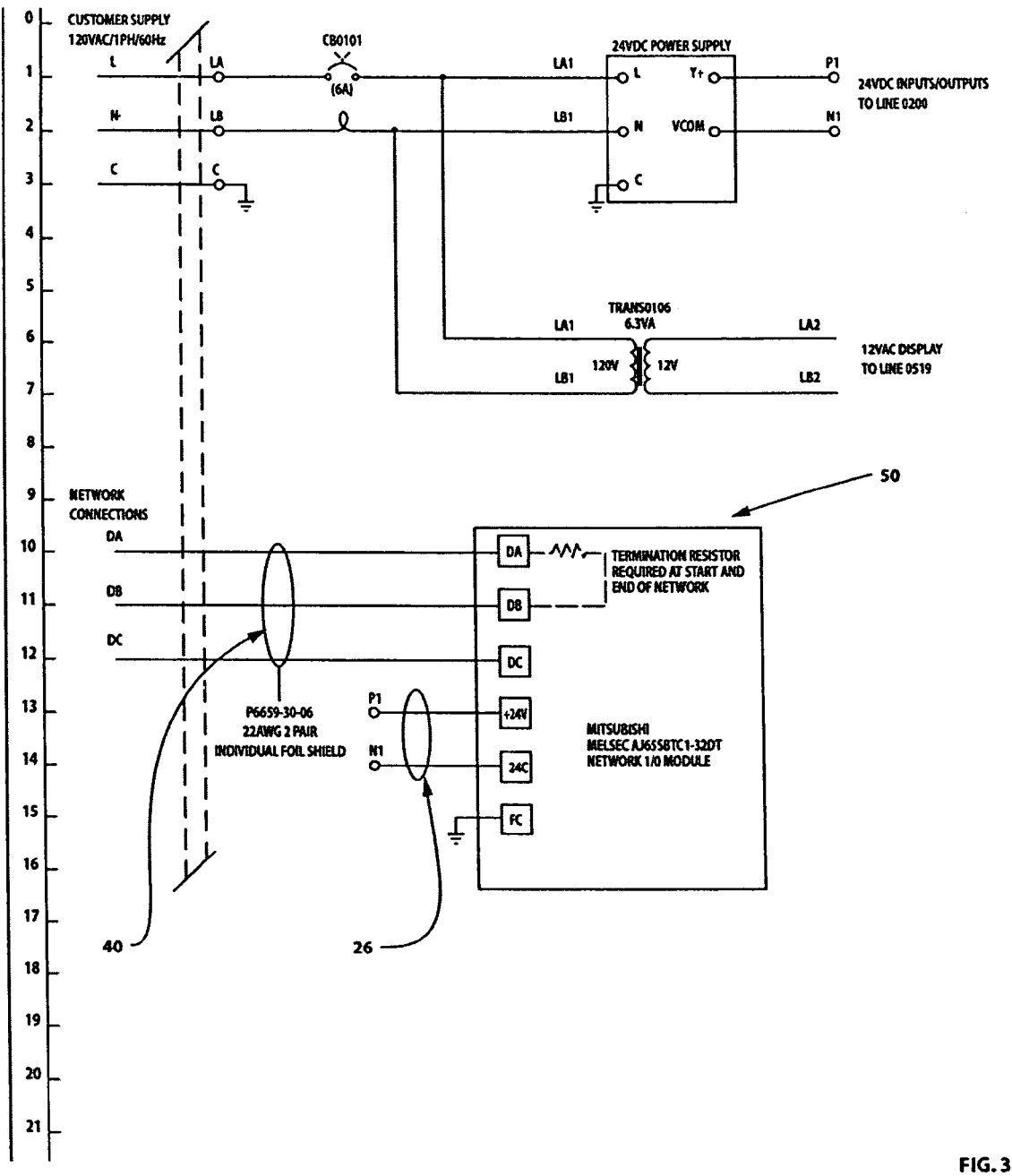
FIGS. 3 through 7 inclusive are schematic circuit views of portions of an assembly line controller as part of the assembly line of FIG. 1.

Referring to FIG. 2, the monitoring system 20 is shown for the assembly line having a number of processing stations, each having one of the controllers shown at 22 and 22*a* to 22*f* Though not shown for each controller 22*a* to 22*f*, each communicates with one or more limit switches or other means of recording the presence of the vehicles in the corresponding processing stations, such as by the use of mechanical, optical or magnetic sensors or the like such as reflectors whose beams are interrupted by the vehicle, or a video camera recording an image of a vehicle or a part thereof entering the processing station. In this case, the controllers 22 and 22*a* to 22*f* communicate with the master controller 38 over communication network 40. The master controller 38 includes a torque controller 38*a* which in turn communicates with one or more assembly line monitoring or controlling functions as shown at 38*b* to 38*d*. FIG. 2 illustrates different exemplified stations for the vehicle assembly line 10 and, in this case, the controller 22 monitors the processing station 12 in the form of a steering gear box processing station, that is a station wherein the steering gear box is installed in a vehicle. The master controller 38 is operative to sense any irregular events on the assembly line 10, including an incomplete torque event at any of the processing stations.

Figure 4:
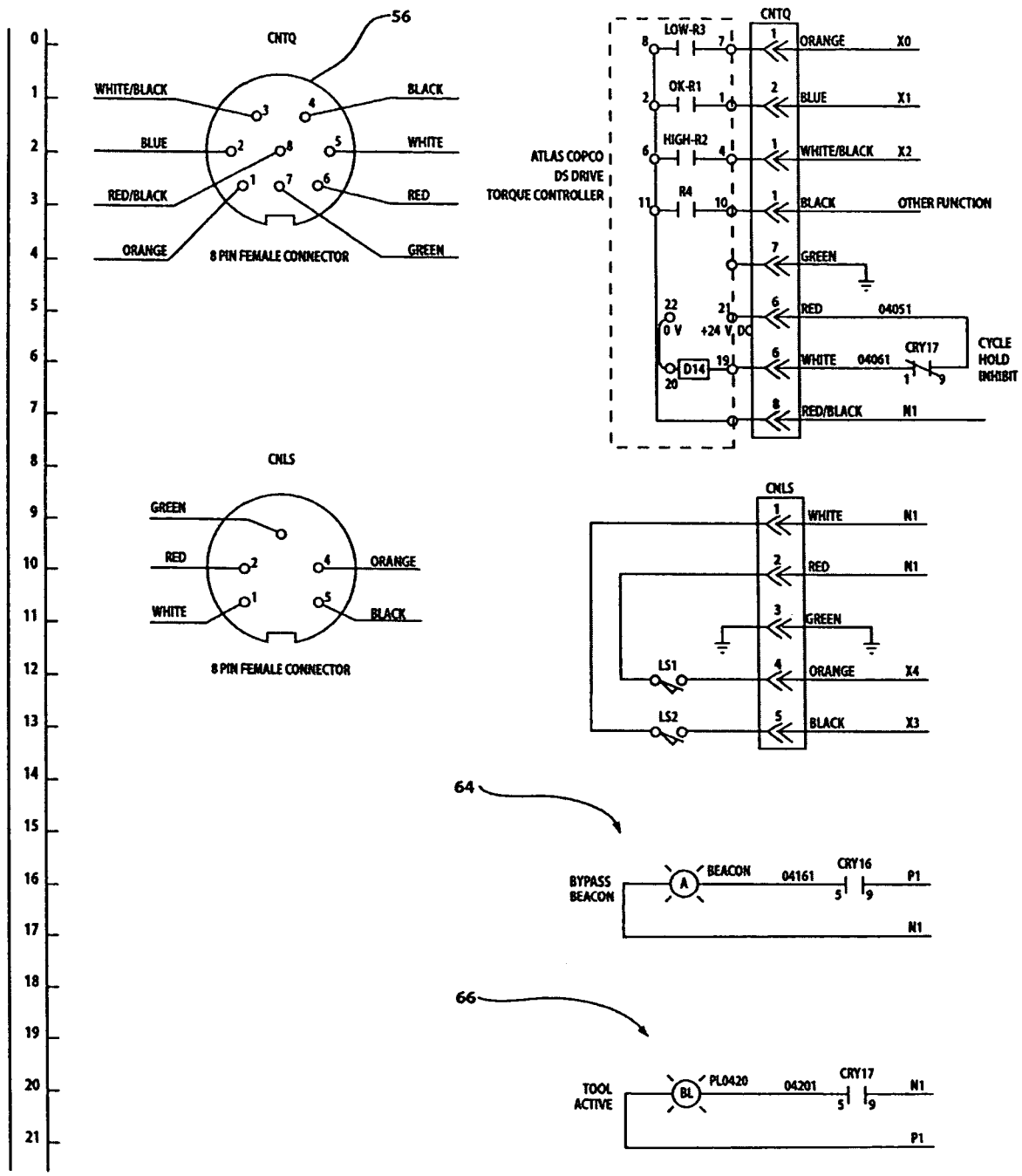
Figure 5:
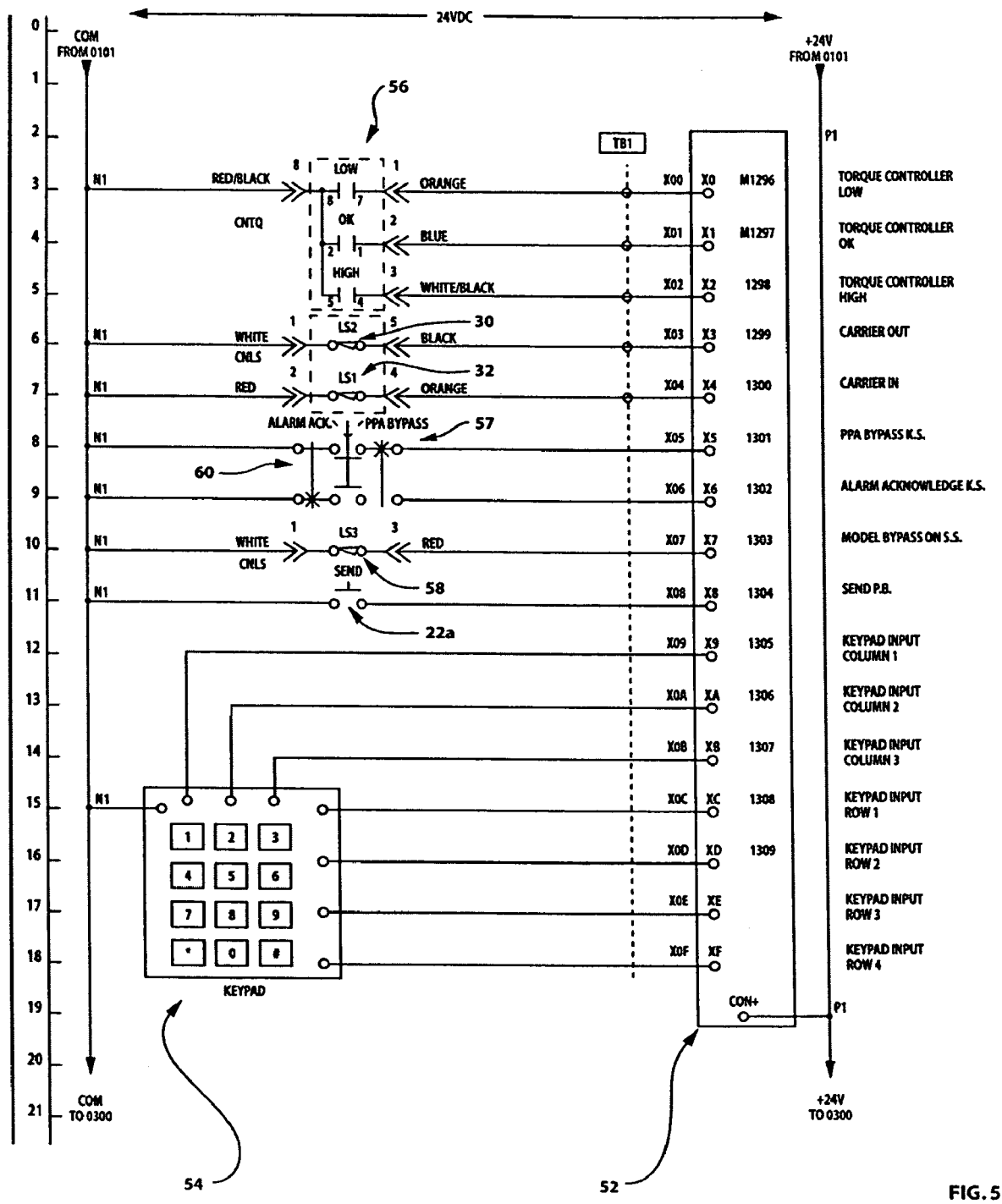
Figure 6:
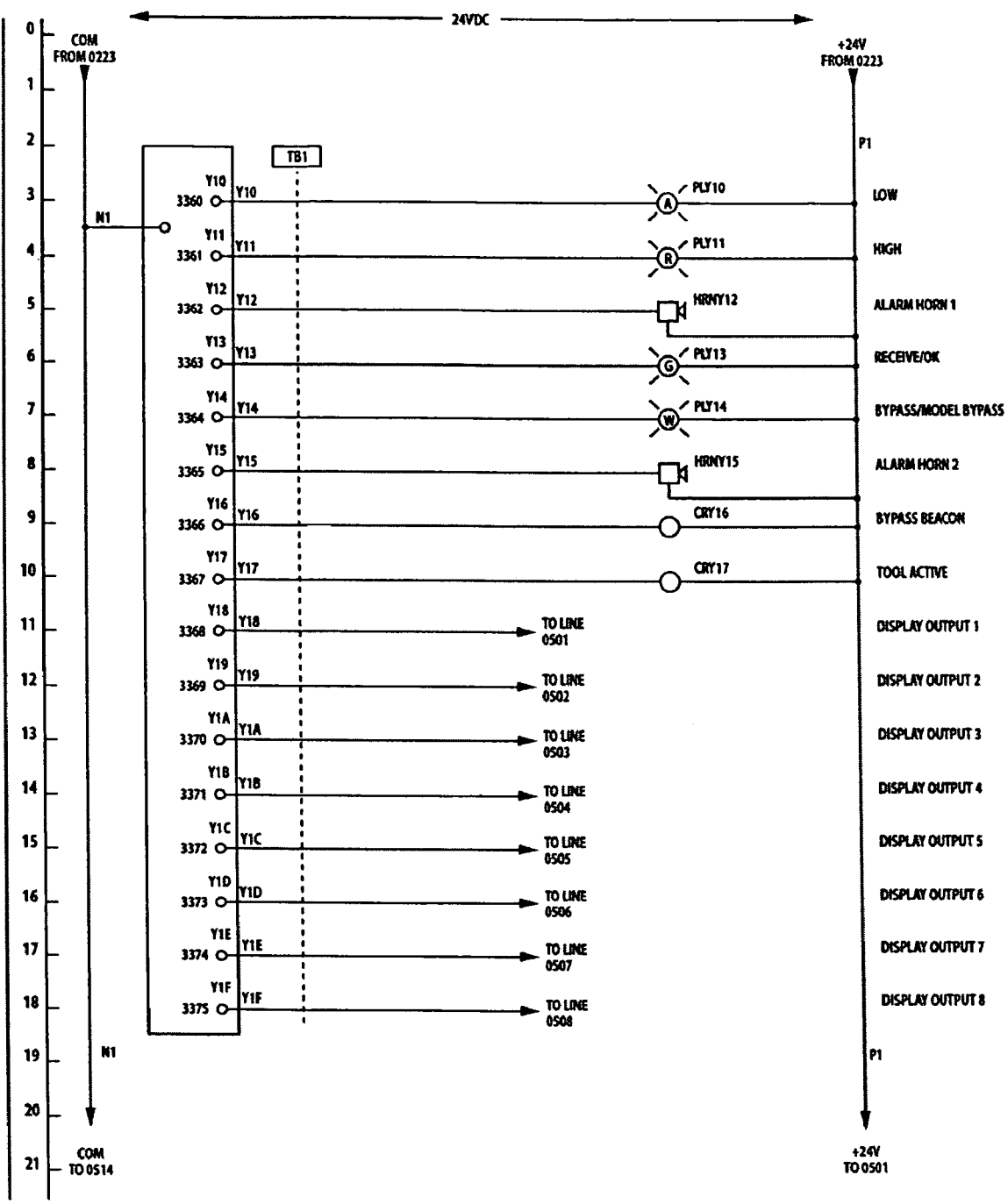
Figure 7:
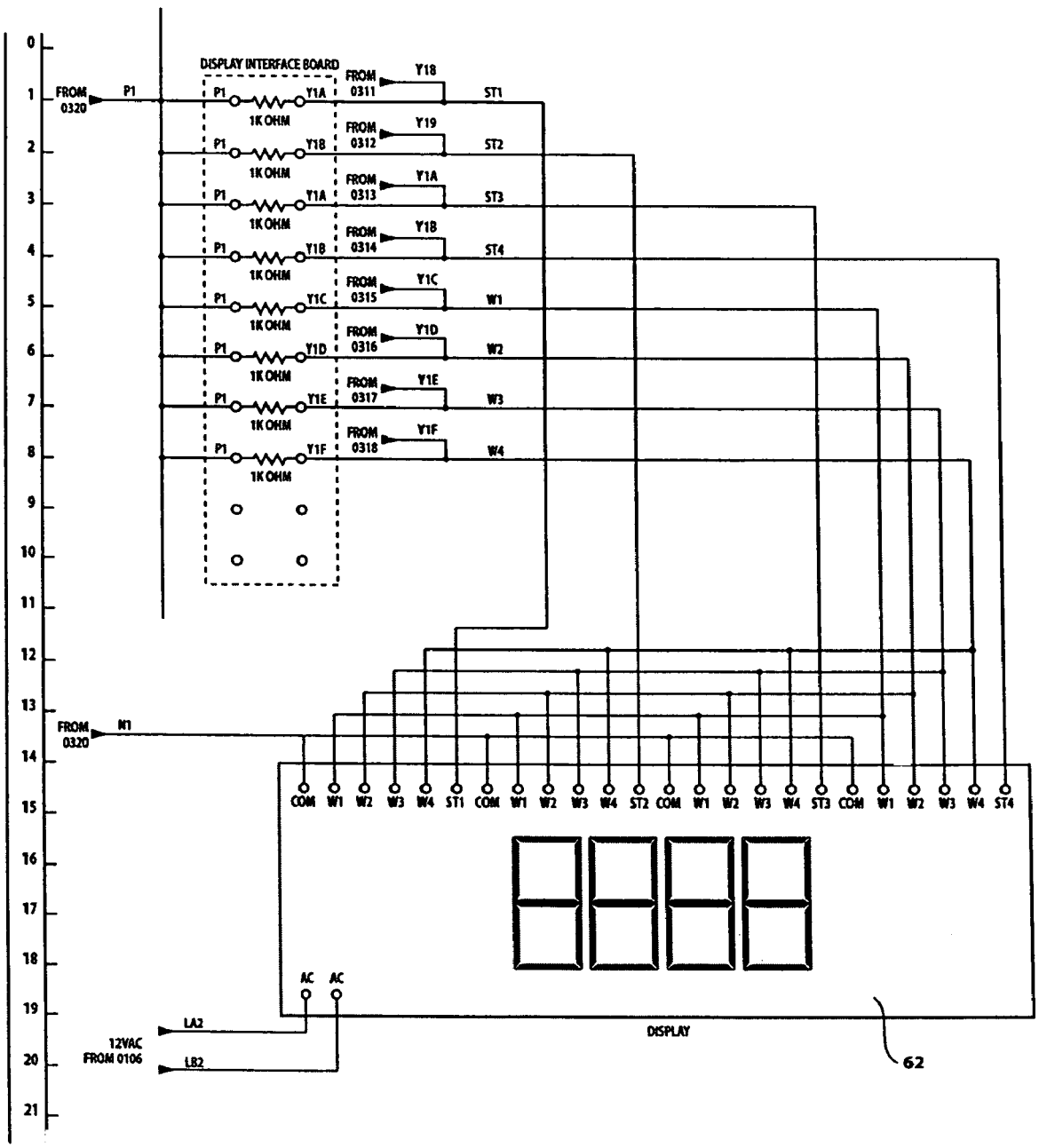

The controller 22 and the torque tool 24 are shown in more detail in FIG. 1*a* and FIGS. 3 to 7. The controller 22 has a programmed logic controller (PLC) 50 (see FIG. 3) having an input interface 52 (see FIG. 5) with inputs 1305 to 1309 which are coupled to a keypad 54 and inputs 1296 to 1298 which are coupled to the torque tool via the eight pin connector 56, as shown in FIGS. 4 and 5. The inputs 1299 and 1300 are coupled to the entry and exit limit switches 30 and 32 respectively. Input 1301 is coupled to a key bypass unit 57 which provides a manual override. Input 1302 is coupled to the torque master controller 38 to receive an error acknowledgement signal at switch 60. Input 1303 is coupled with a model bypass unit switch 58 which permits the operator to bypass a vehicle through the upstream processing station 12, for example when the torque tool 24 is not functioning properly. Input 1304 is coupled to a green (or other suitable colour as desired) send button 22*a* on the exterior face of the controller 22 which has the function of sending the keypad entered vehicle reference number to the master controller 38 to release a vehicle and, if need be, restart the assembly line 10. If the line has not already been stopped, this would prevent stoppage by releasing the vehicle. The PLC 50 is also operable to count the number of successful torque events and to display a count therefor on numerical or graphical display 62 (see FIG. 7). The controller 22 also has number of display beacons, such as beacon 64 to indicate a current status of the processing station, such as when a vehicle leaves the extended upstream procession labelled or otherwise identified for remedial work.

The monitoring system 20 may also, if desired, be capable of monitoring, more precisely, the functions of the torque tool, such as by monitoring the specific locations where the tool is operating. Referring to FIGS. 1*d* and 1*e*, the monitoring system may establish a data structure containing sufficient data to map a predetermined region of the article and the location of fasteners at predetermined locations therein, such as shown at 66. In this case, the monitoring system may be operable to monitor one or more targets, such as at 68, to be hit during a predetermined torque sequence. In other words, the controller 22 may be capable of doing more than merely recording or distinguishing between correct and incorrect torque events on a batch basis. Rather, each torque event may be associated with a particular location or target on the map 66 wherein each target is given a predetermined identify code or address on the vehicle and a value indicative of one or more parameters relating to the torque event at that particular location.

For example, the monitoring system may be capable of recording the location or part name of the torque tool relative to the map, and storing the location of the tool and a predetermined torque condition of the tool in a database in master controller 38. In this manner, the data may be analyzed more carefully to determine if there is a consistent error, not only at a particular processing station, but at a particular bolt (or other particular target) in the processing station. The map 66 may be graphically presented to one or more operators on the assembly line or to an operator at a control station.

The master controller 38 may also equipped with a data base which records the incidence of error signals at the various processing stations 22 and 22*a* to 22*f*, allowing the productivity of the assembly line 10 to be analyzed relative to each processing station.

The system may be used as follows, with reference to FIGS. 1, 1*a*, 1*b* and 1*c*. First, the assembly line 10 is activated to deliver a first vehicle 18 to the upstream processing station 12 to a waiting operator therein, who may be either a human being or a robot, or some other automated processing device. The operator then initiates, and the monitoring system 20 monitors, a predetermined torque protocol on the vehicle 18. The protocol may govern or involve, for one example, the torque down of several bolts on a steering gear box as installed on a vehicle 18. In this case, the monitoring system counts the number of torque events executed by the torque tool 24. These torque events are usually required, for instance, to be within a predetermined torque range depending on the specifications of the fastener and the substrate into which the fastener is being fastened. In this case, then, the monitoring system 20 is operable to count the number of successful torque events within the predetermined range and to count the number of unsuccessful torque events, namely those which fall outside the predetermined range and to display the count on the numerical display 62. Thus, the system is beneficial, in part, because it provides the operator of each processing station the opportunity to confirm that he has completed each of the designated torque functions for that particular processing station.

The vehicle enters the upstream processing station 12 and trips the entry limit switch 30 which conveys an entry signal to the controller 22 to initiate a batch count of the torque functions. As the vehicle passes through the upstream processing station 12 the operator works through the torque functions and each torque function causes a signal to be conveyed from the torque tool 24 to the controller 22 via inputs 1296 to 1298 on the PLC 52. When leaving the upstream processing station 12, the vehicle trips the exit limit switch 32, sending an exit signal to the controller 22 via input 1300. The controller 22 then compares a batch count with a predetermined count for that particular process. If the batch count is below the predetermined count the controller 22 issues an alarm signal to the operator. The controller 22 then extends the length of the upstream processing station 12 to form the extended upstream processing station 12,17 to permit the operator sufficient extra time to complete the required number of torque functions. If the operator completes the torque task(s) successfully, the controller 22 records a complete torque function while another vehicle enters the upstream processing station, in which case an entry signal from the limit switch 30 is received by the controller 22 via input 1299, causing the batch counting function to be reset.

Figure 1A:
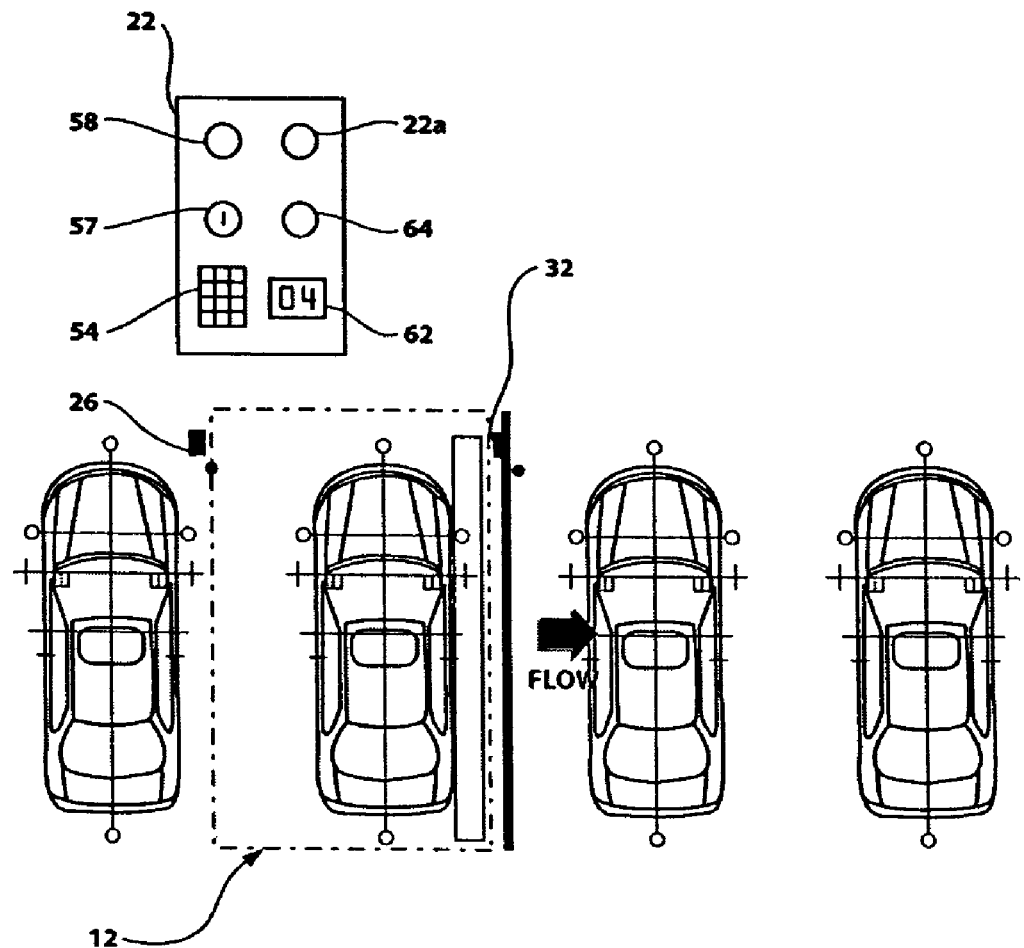
FIGS. 1a and 1b are comparative schematic views of assembly lines.
Figure 1B:
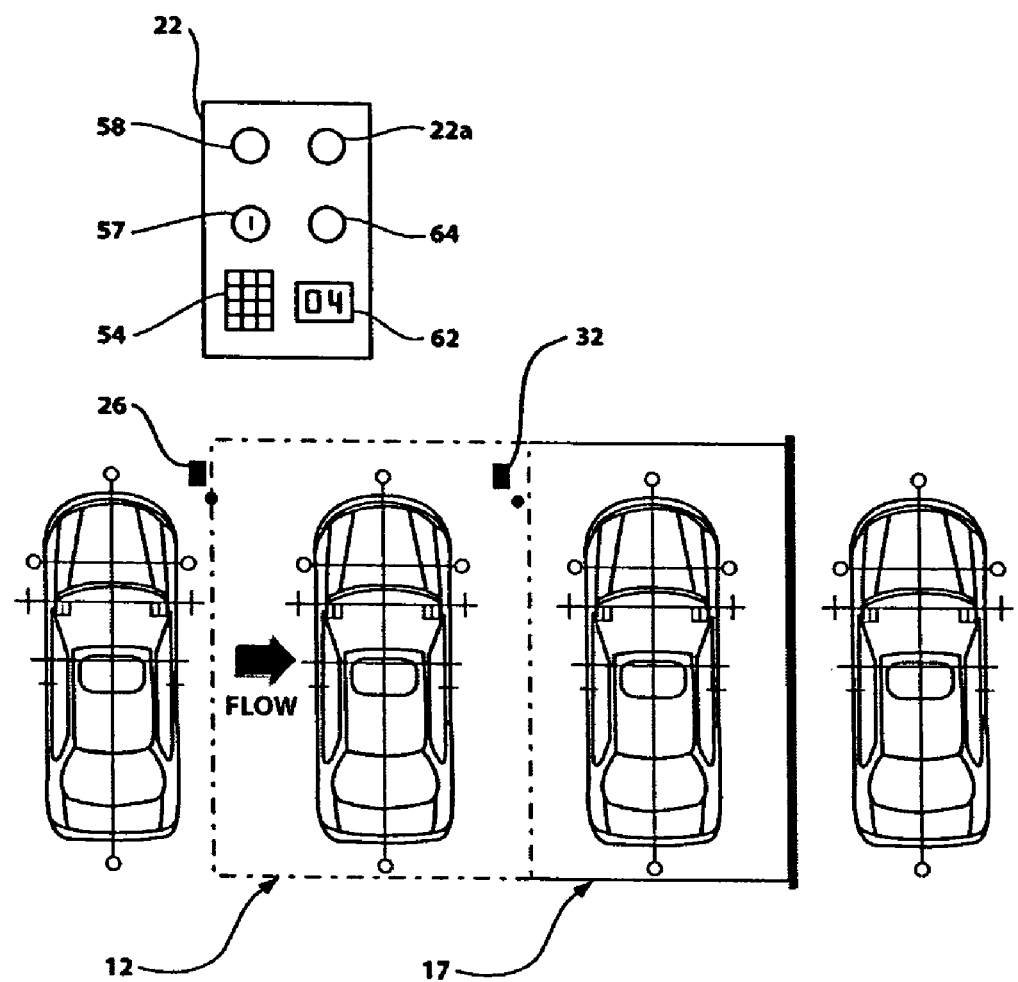
Figure 1C:
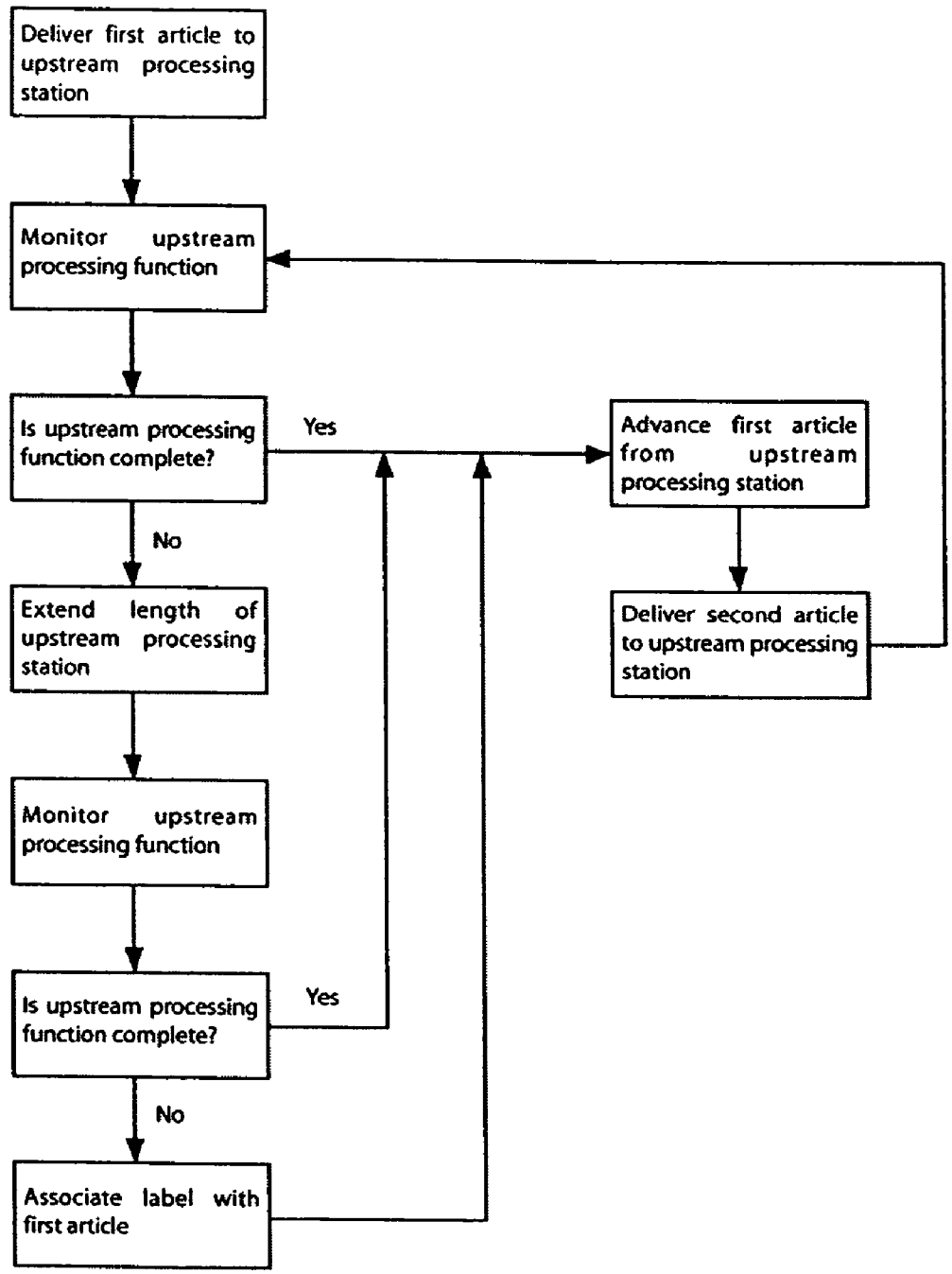
FIG. 1c is a schematic flow diagram of an assembly line process.
Figure 1D:
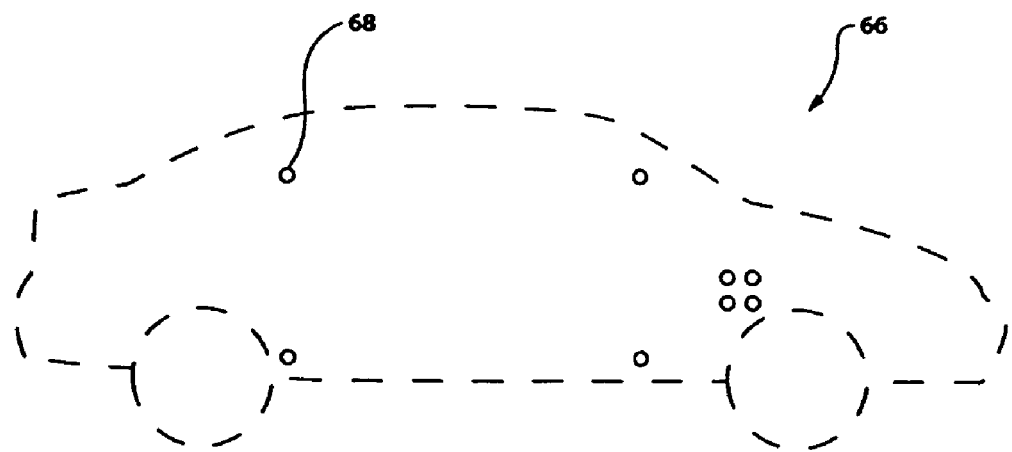
FIGS. 1d and 1e are schematic representations of maps for steps carried out on the assembly line of FIG. 1.
Figure 1E:
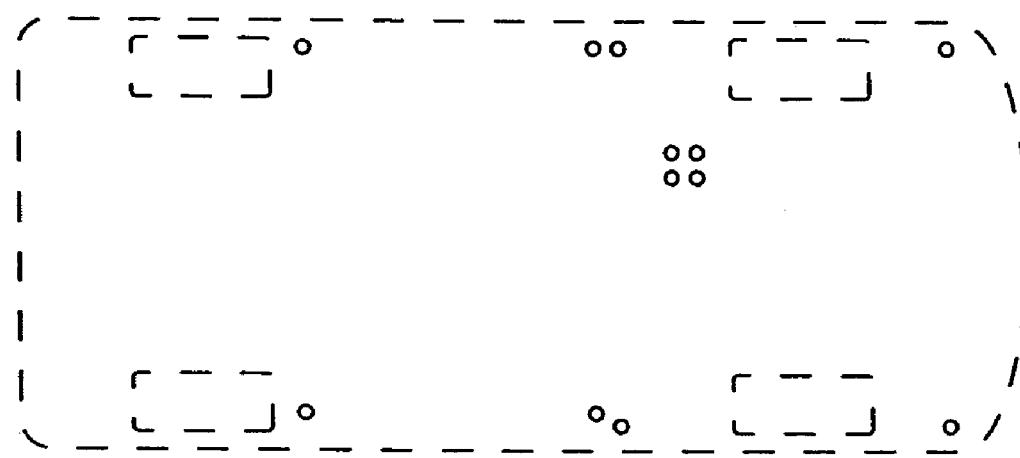

As shown in FIG. 1a, the alarm signal may, in one example, be issued before the vehicle triggers the exit limit switch 32, for example after a preset time period has passed, for example in the order of ten seconds. The alarm signal thus may function as a warning signal, to give the operator the opportunity to complete the upstream processing function. The assembly line 10 may be configured to stop temporarily, if the vehicle reaches the exit limit switch 32, with the upstream processing function still not complete, at which time the upstream processing station may be extended and the conveyor restarted. As the vehicle reaches the exit limit switch 32, the controller 22 detects that the upstream processing function is still not complete and the controller 22 may issue a periodic or constant alarm signal while the vehicle is in the extended zone 17 of the extended upstream processing stations 12,17 until the upstream processing function is completed.

If the controller detects that the vehicle reaches the boundary of the extended upstream processing station 12, 17 or a designated location near that boundary, the controller 22 may stop the conveyor temporarily, with or without the same or different alarm signal, allowing the operator in the upstream processing station 12 still more time to complete the processing function, at which time the operator enters the vehicle registration number in the keypad 54 and presses the green send button 22a to allow the vehicle to pass. In this case, the controller 22 arranges for a label to be printed for, or associated with, the vehicle, or a pre-existing label file to be updated, to indicate that remedial work is needed relative to the upstream processing function. Thus, the operator records the incomplete function either manually or electronically on a label on the vehicle, that is on the final inspection card or memory chip travelling with the vehicle, or a file stored electronically elsewhere, such as in the monitoring system 20.

The torque tool may be, for instance an impact gun, or another tool such as a paint sprayer, a power ratchet tool, an power drill, a power sander, or any other tool in which the process function carried out by that tool may be monitored by a controller under predetermined conditions to indicate either a correct or incorrect process function.

Thus, when the vehicle is in the upstream processing station 12, the controller 22 notifies the operator with a chirp or some other audible or visual signal and then indicates to the operator that the torque tool is ready for use. During the operation of the tool, the controller maintains a record of "OK" signals received from the torque tool. As the controller receives an OK signal, the controller 22 updates a batch counter or display on the controller 22 and shows the operator the number of good torque functions. When the correct number of torque functions is complete, the controller 22 notifies that the master controller 38 that everything is normal and continues running online.

In an abnormal situation, where the correct number of torque functions has not been met and the vehicle trips the exit limit switch 32, another vehicle may be entering the processing station from the upstream side and the alarm continues to issue the alarm signal until the torque function protocol for that processing station is finished or until the operator enters the vehicle registration in the key pad and overrides the alarm, and a potential stoppage of the assembly line 10.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A method of controlling an assembly line, comprising the steps of:
    providing a moving assembly line to move a series of articles along a number of processing stations;
    designating a first of the processing stations on the assembly line;
    providing the first processing station with a first length;
    providing an entry signal to be representative of an arrival of an article in the first processing station and/or an exit signal to be representative of a departure of the article from the first processing station;
    delivering a first article to the first processing station;
    providing a designated processing function in the first processing station;
    monitoring the designated processing function on the first article within the first processing station over a first monitoring period according to the entry signal and/or the exit signal;
    being ready to detect in the first processing station, a first condition in which the designated processing function on the first article is not complete within the first monitoring period and responsive to the first condition:
        issuing a signal to an operator in the first processing station that the designated processing function on the first article is not complete;
        extending the first processing station along the assembly line to allow the operator an additional length portion of the assembly line to complete the designated processing function; and
        monitoring the designated processing function in the extended first processing station over a second monitoring period;
    being ready to detect in the first processing station as extended, a second condition in which the designated processing function on the first article is not complete within the second monitoring period; and responsive to the second condition:
        associating a label with the first article for remedial attention; and
        advancing the first article along the assembly line from the first processing station as extended.

2. The method as defined in claim 1, wherein the extended first processing station is returned to its original length when the designated processing function on the first article is either complete or when the first article is advanced beyond the first processing station along the assembly line.

3. The method as defined in claim 1, wherein the assembly line is a vehicle assembly line.

4. The method as defined in claim 3, wherein the first processing station is a torque theatre.

5. The method as defined in claim 4, wherein the monitoring step includes counting the number of correct torque functions executed in the torque theatre.

6. The method as defined in claim 4, wherein the step of monitoring includes the steps of providing a torque tool and sensing the operation of the torque tool to determine when the torque tool is operating within a first set of predetermined conditions to register a correct torque function and to determine when the torque tool is operating within a second set of predetermined conditions to register an incorrect torque function.

7. The method as defined in claim 6, wherein the monitoring step includes the step of providing a map of torque targets to be hit during a predetermined torque sequence.

8. The method as defined in claim 7, wherein the step of monitoring includes the step of recording the location of the torque tool relative to the map, and storing the location of the torque tool and a predetermined torque condition of the torque tool at each location.

9. A method of controlling an assembly line, comprising the steps of:
providing an article assembly line to move a plurality of articles along a number of processing stations;
designating a first of the processing stations on the assembly line;
providing the first processing station with a first length;
providing an entry signal to be representative of an arrival of an article in the first processing station and/or an exit signal to be representative of a departure of an article from the first processing station;
delivering a first article to the first processing station;
providing a designated processing function in the first processing station;
monitoring the designated processing function on the first article within the first processing station over a monitoring period according to the entry signal and/or the exit signal;
detecting a condition in which the designated processing function in the first processing station on the first article is not complete within the monitoring period:
issuing a signal to an operator in the first processing station that the designated processing function on the first article is not complete;
extending the first processing station along the assembly line to form an extended first processing station to cause the extended first processing station to at least partially overlap a second processing station along the assembly line, to allow the operator and additional length portion of the assembluy line to complete the designated processing function;
monitoring the designated processing function in the extended first processing station; and
advancing the first article along the assembly line from the extended first processing station.

10. A method of controlling an assembly line, comprising the steps of:
providing an article assembly line to move a plurality of articles along a number of processing stations;
designating a first of the processing stations on the assembly line;
wherein the first processing station is immediately adjacent a second of the processing stations;
providing the first processing station with a first length;
providing an entry signal to be representative of an arrival of an article in the first processing station and/or an exit signal to be representative of a departure of the article from the first processing station;
delivering a first article to the first processing station;
providing a designated processing function in the first processing station;
monitoring the designated processing function on the first article within the first processing station over a monitoring period accord to the entry signal and/or the exit signal;
detecting a condition in which the designated processing function in the first processing station on the first article is not complete within the monitoring period; and responsive to the condition:
issuing a signal to an operator in the first processing station that the designated processing function on the first article is not complete;
extending the first processing station along the assembly line and shortening the length of the second processing station as a result of extending the first processing station to form an extended first processing station to allow the operator an additional length of the assembly line to complete the designated processing function;
monitoring the designated processing function in the extended first processing station; and
advancing the first article along the assembly line from the extended first processing station.

11. The method as defined in claim 10, further including the step of issuing one or more signals to an operator in the first processing station and issuing one or more signals to an operator in the second processing station, the one or more signals indicating that the designated processing function is not complete.

12. The method as defined in claim 11, wherein the same signal is issued to both the first and second operators.

13. The method as defined in claim 11, wherein the signal is visible and/or audible by both the first and second operators.

14. The method as defined in claim 11, wherein the signal is conveyed, or encoded on a carrier signal which is conveyed, over a wired and/or wireless data link.

15. An assembly line, comprising:
a first processing station and a second processing station;
conveyor means for conveying a plurality of articles along the assembly line and through the processing stations;
at least one first processing means for processing an article delivered to the first processing station;
a first entry signal generating means to issue a first entry signal to be representative of an arrival of an article in the first processing stations:
a first exit signal generating means to issue a first exit signal to be representative of a departure of the article from the first processing station;
first process monitoring means for monitoring a first processing function over a first monitoring period according to the first entry signal and/or the first exit signal;
at least one second processing means for processing an article delivered to the second processing station;

a second entry signal generating means to issue a second entry signal to be representative of an arrival of an article in the second processing stations;

a second exit signal generating means to issue a second exit signal to be representative of a departure of the article from the second processing station;

second process monitoring means for monitoring a second processing function over a second monitoring period according to the second entry signal and/or the second exit signal;

master monitoring means, communicating with each of the first and second process monitoring means for monitoring the assembly line;

each of the first and second process monitoring means being operable to detect a first condition in which the corresponding processing function is not complete;

each of the first and second process monitoring means being responsive to the first condition to issue a signal to an operator in the corresponding processing station that the corresponding processing function is not complete, and to extend the length of the travel of the conveyor means along the assembly line for the corresponding processing station to form an extended processing station for the operator to complete the corresponding processing function;

the corresponding process monitoring means being operable to monitor the processing function in the extended processing station according to the corresponding entry signal and/or the corresponding exit signal;

the process monitoring means being operable detect a second condition in which the processing function on the article in the extended processing station is still not complete; the process monitoring means being responsive to the second condition to cause a label to be associated with the corresponding article for remedial attention.

16. A method of controlling an assembly line, comprising:

a step for providing a moving assembly line;

a step for designating a first processing station on the assembly line;

a step for providing an entry signal to be representative of an arrival of an article in the first processing station and/or an exit signal to be representative of a departure of the article from the first processing station;

a step for delivering a first article to the first processing station;

a step for providing a designated processing function in the first processing station;

a step for monitoring the designated processing function on the first article within the first processing station over a monitoring period according to the entry signal and/or the exit signal;

a step for being ready to detect a first condition in which the designated processing function in the first processing station on the first article is not complete within the monitoring period, and responsive to the first condition:

a step for issuing a signal to an operator in the first processing station that the designated processing function on the first article is not complete;

a step for extending the first processing station along the assembly line to allow the operator an additional length portion of the assembly line to complete the designated processing function;

a step for monitoring the designated processing function in the extended first processing station;

a step for being ready to detect a second condition in which the designated processing function on the first article is not complete in the extended first processing station; and responsive to the second condition:

a step for associating a label with the first article for remedial attention;

a step for advancing the first article along the assembly line from the extended first processing station.

17. A processing system, comprising:

a first processing station positioned on a moving processing line;

a conveyor to convey a plurality of articles along the processing line and through the first processing station;

at least one first processor to process an article delivered to the first processing station according to a first processing function;

a first entry signal generator to issue a first entry signal to be representative of an arrival of an article in the first processing station, a first exit signal generator to issue a first exit signal to be representative of a departure of the article from the first processing station;

a process monitor to monitor the first processing function over a first monitoring period according to the entry signal and/or the exit signal;

the process monitor being responsive to a first condition in which the first processing function is complete, to issue a signal to an operator in the first processing station that the corresponding processing function is not complete, and to extend the length of the processing line corresponding to the first processing station to form an extended first processing station for the operator to complete the first processing function;

the process monitor being operable to monitor the first processing function in the extended first processing station over a second monitoring period according to the entry signal and/or the exit signal;

the process monitor being operable in the second condition in which the first processing function in the extended first processing station is still not complete to cause a label to be associated with the corresponding article for remedial attention.

18. The system as defined in claim 17, the process monitor being operable to return the extended first processing station to its original size when the first processing function is either complete or when the first article is advanced beyond the first processing station.

19. The system line as defined in claim 17, wherein the first processing station is a torque theatre.

20. The system line as defined in claim 19, wherein the process monitor is operable to count a number of correct torque functions executed in the torque theatre.

21. The system line as defined in claim 20, the first processing station including a torque tool, the process monitor being operable to sense the operation of the torque tool to determine when the torque tool is operating within a first set of predetermined conditions to register a correct torque function and to determine when the torque tool is operating within a second set of predetermined conditions to register an incorrect torque function.

22. The system line as defined in claim 21, further comprising a display to provide a graphical representation of a map of torque targets to be hit during a predetermined torque sequence.

23. The system line as defined in claim 22, the display being operable to record the location of the torque tool relative to the map, further comprising a data storage unit for storing the location of the torque tool and a predetermined torque condition of the torque tool at each location.

24. The system as defined in claim 17, wherein the processing line is operable to travel along a flow path in a predetermined direction.

25. The system as defined in claim 17, wherein the processing line is operable to travel along a flow path in more than one predetermined direction.

26. A processing system comprising:
a first processing station positioned on a processing line;
a conveyor for conveying a plurality of articles along the processing line and through the first processing station;
at least one first processor for processing an article delivered to the first processing station according to a first processing function;
a first entry signal generator to issue a first entry signal to be representative of an arrival of an article in the first processing station;
a first exit signal generator to issue a first exit signal to be representative of a departure of the article from the first processing station;
a process monitor operable to monitor the first processing function over a first monitoring period according to the entry signal and/or the exit signal;
the process monitor being responsive to a first condition in which the first processing function is not compete, to issue a signal to an operator in the first processing station that the corresponding processing function is not complete; and to extend the length of the processing line corresponding to the first processing station,
the extended first processing station at least partially overlapping a second processing station to form an extended first processing station for the operator to complete the first processing function;
the process monitor being operable to monitor the first processing function in the extended first processing station over a second monitoring period according to the entry signal and/or the exit signal;
the process monitor being operable in a second condition in which the first processing function in the extended first processing station is still not complete in the second monitoring period to cause a label to be associated with the corresponding article for remedial attention.

27. The system as defined in claim 26, the process monitor being operable to shorten the length of the processing line for the second processing station according to the extended first processing station.

28. The system as defined in claim 27, the process monitor being operable to issue one or more signals to an operator in the first processing station and/or one or more signals to an operator in the second processing station, the one or more signals indicating that the first processing function is not complete.

29. The system as defined in claim 28, wherein the signal is visible and/or audible by both the first and second operators.

30. The system as defined in claim 28, wherein the signal is conveyed, or encoded on a carrier signal which is conveyed, over a wired and/or wireless data link.

31. A method of monitoring the productivity of an operator in a processing station in an assembly line, comprising:
providing a moving assembly line;
designating a first processing station on the assembly line;
providing an entry signal to be representative of an arrival of an article in the first processing station and/or an exit signal to be representative of a departure of the article from the first processing station;
delivering a first article to the first processing station;
providing a designated processing function in the first processing station;
monitoring the designated processing function on the first article within the first processing station over a monitoring period according to the entry signal and/or the exit signal;
detecting a first condition in which the designated processing function in the first processing station on the first article is not complete within the monitoring period; and responsive thereto
issuing a signal to an operator in the first processing station that the designated processing function on the first article is not complete;
extending the first processing station along the assembly line to allow the operator an additional length portion of the assembly line to complete the designated processing function;
monitoring the designated processing function in the extended first processing station;
detecting a second condition in which the designated processing function on the first article is not complete, and responsive thereto;
associating a label with the first article for remedial attention;
advancing the first article along the assembly line from the extended first processing station;
recording an incomplete first processing function event.

* * * * *

UNITED STATES PATENT AND TRADEMARK OFFICE
CERTIFICATE OF CORRECTION

PATENT NO. : 7,162,320 B2 Page 1 of 1
APPLICATION NO. : 10/813340
DATED : January 9, 2007
INVENTOR(S) : Derson et al.

It is certified that error appears in the above-identified patent and that said Letters Patent is hereby corrected as shown below:

Column 13, Line 57 (Claim 9, Line 29), delete "and", and insert --an--.

Column 14, Line 58 (Claim 15, Line 9), delete "stations", and insert --station--.

Column 16, Line 27 (Claim 17, Line 19), after "is", insert --not--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,162,320 B2　　　　　　　　　　　　　　　　　　　　　　　Page 1 of 1
APPLICATION NO. : 10/813340
DATED : January 9, 2007
INVENTOR(S) : Derson et al.

It is certified that error appears in the above-identified patent and that said Letters Patent is hereby corrected as shown below:

Column 13, Line 58 (Claim 9, Line 30), delete "assembluy", and insert --assembly--.

Signed and Sealed this

Twenty-ninth Day of May, 2007

JON W. DUDAS
*Director of the United States Patent and Trademark Office*